United States Patent
Barry

(10) Patent No.: US 10,789,647 B2
(45) Date of Patent: *Sep. 29, 2020

(54) ORDER GRID HIGHLIGHTING

(71) Applicant: Chicago Mercantile Exchange Inc., Chicago, IL (US)

(72) Inventor: James David Russell Barry, London (GB)

(73) Assignee: Chicago Mercantile Exchange Inc., Chicago, IL (US)

( * ) Notice: Subject to any disclaimer, the term of this patent is extended or adjusted under 35 U.S.C. 154(b) by 38 days.

This patent is subject to a terminal disclaimer.

(21) Appl. No.: 16/012,488

(22) Filed: Jun. 19, 2018

(65) Prior Publication Data

US 2018/0300810 A1 Oct. 18, 2018

Related U.S. Application Data

(63) Continuation of application No. 14/307,176, filed on Jun. 17, 2014, now Pat. No. 10,026,124.

(60) Provisional application No. 61/835,924, filed on Jun. 17, 2013.

(51) Int. Cl.
*G06Q 40/04* (2012.01)
*G06Q 40/06* (2012.01)

(52) U.S. Cl.
CPC ............. *G06Q 40/04* (2013.01); *G06Q 40/06* (2013.01)

(58) Field of Classification Search
CPC ...................................................... G06Q 40/04
USPC ........................................................ 705/37
See application file for complete search history.

(56) References Cited

U.S. PATENT DOCUMENTS

| | | | | |
|---|---|---|---|---|
| 7,890,414 B2* | 2/2011 | Brumfield | ............... | G06Q 20/10 705/37 |
| 2003/0055776 A1* | 3/2003 | Samuelson | ............ | G06Q 40/04 705/37 |
| 2005/0222936 A1* | 10/2005 | Panariti | .................. | G06Q 40/04 705/37 |
| 2005/0256797 A1 | 11/2005 | Tyulyaev | | |
| 2006/0020538 A1* | 1/2006 | Ram | .................. | G06Q 30/0222 705/37 |
| 2008/0313098 A1 | 12/2008 | Janowski et al. | | |

(Continued)

OTHER PUBLICATIONS

PCT/US2014/042766 International Search Report dated Oct. 23, 2014.

*Primary Examiner* — Hao Fu
(74) *Attorney, Agent, or Firm* — Lempia Summerfield Katz LLC

(57) ABSTRACT

Systems, methods and user interfaces are provided for order matrix management and highlighting. Market data may be arranged in a matrix where the market data may be highlighted and/or otherwise presented to provide further information to a user. In some cases a computer system may include a computer-readable medium containing computer-executable instructions that, when executed by one or more processors, cause a computing device to receive market data for a financial instrument. The computer system may further process instructions to identify pending orders that may result in a cross trade, such as with trades entered by a trader or between members of a same business organization. The computer system may further process instructions that cause the computer system to generate a user interface that highlights which of the pending orders that may result in a cross trade.

20 Claims, 7 Drawing Sheets

(56) References Cited

U.S. PATENT DOCUMENTS

2009/0292633 A1     11/2009   Crist
2013/0018775 A1*   1/2013   Brumfield .............. G06Q 40/00
                                                                               705/37
2013/0212000 A1      8/2013   Foster, II

* cited by examiner

| Term | + | Qty | Bid |
|---|---|---|---|
| Henry Hub Financial Future | | | |
| Mar13 | + | 10 | 3.236 |
| Apr13 | + | 8 | 3.300 |
| May13 | + | 7 | 3.369 |

| Apr13 | + | — | 1,085 | × | 3.300 | ← 360 |
| | | | 999 | ○ | 3.280 | |
| | | | 999 | ○ | 3.271 | |
| | | | 999 | ○ | 3.269 | |
| | | | 999 | × | 3.266 | ← 370 |
| | | | 50 | ○ | 3.256 | |
| | | | 2,997 | ○ | 3.250 | |
| | | | 482 | ○ | 3.230 | |
| | | | 1 | ○ | 3.117 | |
| | | | 2 | ○ | 3.070 | |

Brent Future Apr13
Status : Live
Price: 107.50 USD/Barrel
Quantity: 100 Contracts
Filled: 22 Contracts
Order Type: Limit
Time In Force: Day
Age: 8 mins
Trader: Joe Bloggs/BP
Clearing: CME (GSCOTTJUMP)

Time: 10:44:08
Vol: 16,182
Chg: -0.30
High: 92.76
Low: 92.42
Settle: 92.76

ORDER GRID HIGHLIGHTING

The present application is a continuation of U.S. patent application Ser. No. 14/307,176 entitled "Order Grid Highlighting" that was filed on Jun. 17, 2014, now U.S. Pat. No. 10,026,124, which claims priority to U.S. Provisional Patent Application Ser. No. 61/835,924, filed Jun. 17, 2013, and the entire disclosure of the applications is hereby incorporated by reference.

FIELD OF THE INVENTION

The present invention relates to systems, methods and user interfaces that are utilized in connection with the trading of financial instruments. More particularly, the invention provides mechanisms for creating an order book that highlights orders within the same company.

DESCRIPTION OF THE RELATED ART

Typical user interfaces used with the trading of financial instruments display market depth information in a table format. The table lists bid and offer prices and corresponding quantities. Some tables used with futures contracts may also identify deliver dates. Existing user interfaces condense large amounts of information and display information most likely needed by traders and others. As a result, traders and others do not always have all relevant information when submitting orders. This can result in situations, for example, in which a trader or someone else submits an order that will be matched against one of the traders existing resting orders or an order of someone else associated with a trader.

Therefore, there is a need in the art for systems, methods and user interfaces that provide improved information to traders.

SUMMARY OF THE INVENTION

The present invention overcomes at least some of the problems and limitations of the prior art by providing systems, methods and user interfaces that mitigates occurrences of cross trades by highlighting orders with a company or other entity.

In various embodiments, the present invention can be partially or wholly implemented on a computer-readable medium, for example, by storing computer-executable instructions or modules, or by utilizing computer-readable data structures.

Of course, the methods and systems disclosed herein may also include other additional elements, steps, computer-executable instructions, or computer-readable data structures.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein:

Figures 2A, 2B, 2C, 2D:
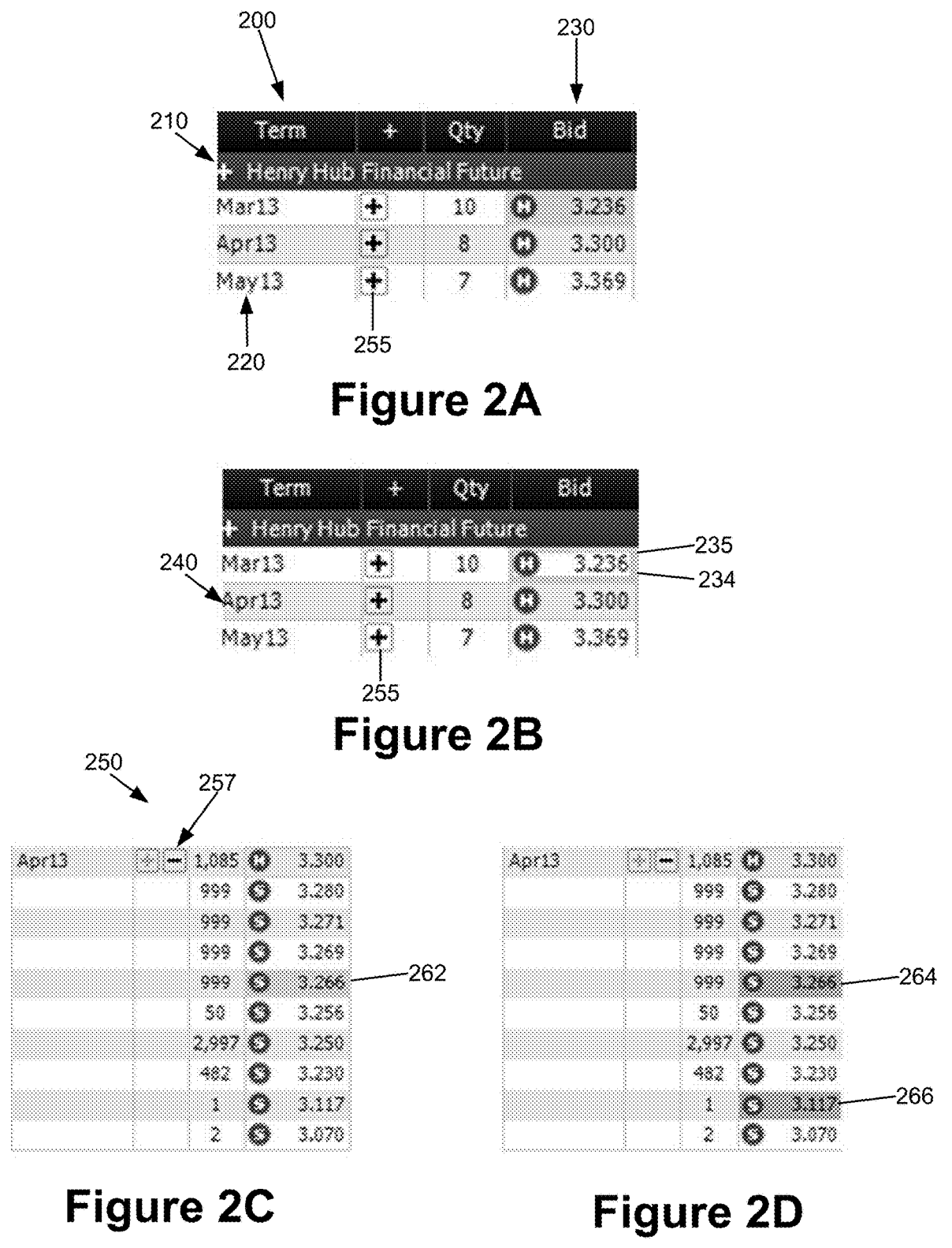

FIGS. 2A-2D show a portion of an illustrative user interface for highlighting an order based on trading systems and methods according to at least some embodiments.

FIGS. 3A and 3B show a portion of an illustrative user interface for highlighting an order based on trading systems and methods according to at least some embodiments FIGS. 4-5 show illustrative windows for showing further information about highlighted orders according to some embodiments.

DETAILED DESCRIPTION OF THE INVENTION

Figure 1:
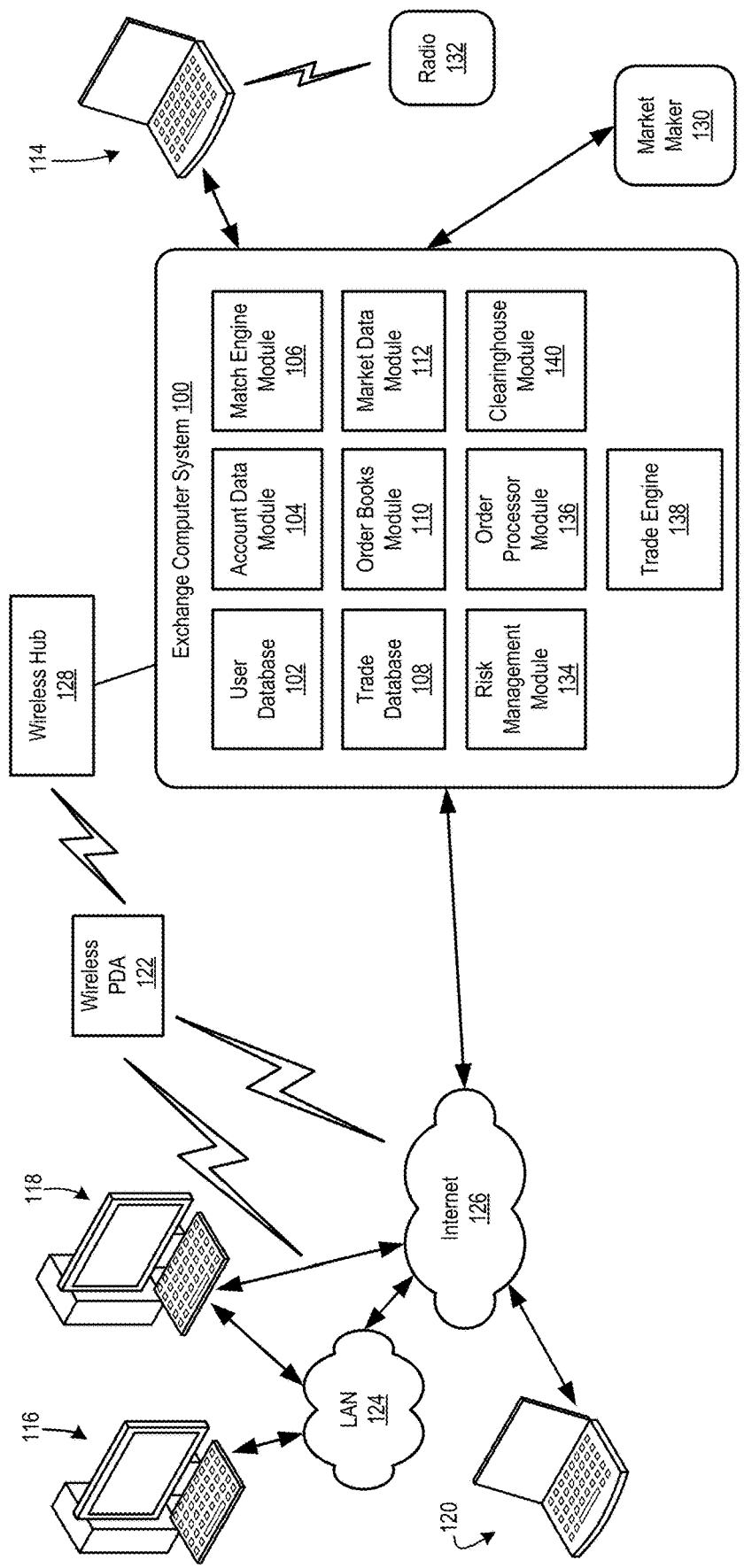
FIG. 1 shows a computer network system that may be used to implement aspects of the present invention.

Aspects of the present invention are preferably implemented with computer devices and computer networks that allow users to exchange trading information. An exemplary trading network environment for implementing trading systems and methods is shown in FIG. 1.

Exemplary Operating Environment

Aspects of at least some embodiments can be implemented with computer systems and computer networks that allow users to communicate trading information. An exemplary trading network environment for implementing trading systems and methods according to at least some embodiments is shown in FIG. 1. The implemented trading systems and methods can include systems and methods, such as are described herein, that facilitate trading and other activities associated with financial products based on currency pairs.

Computer system 100 can be operated by a financial product exchange and configured to perform operations of the exchange for, e.g., trading and otherwise processing various financial products. Financial products of the exchange may include, without limitation, futures contracts, options on futures contracts ("futures contract options"), and other types of derivative contracts. Financial products traded or otherwise processed by the exchange may also include over-the-counter (OTC) products such as OTC forwards, OTC options, etc.

Computer system 100 receives orders for financial products, matches orders to execute trades, transmits market data related to orders and trades to users, and performs other operations associated with a financial product exchange. Exchange computer system 100 may be implemented with one or more mainframe, desktop or other computers. In one embodiment, a computer device uses one or more 64-bit processors. A user database 102 includes information identifying traders and other users of exchange computer system 100. Data may include user names and passwords. An account data module 104 may process account information that may be used during trades. A match engine module 106 is included to match prices and other parameters of bid and offer orders. Match engine module 106 may be implemented with software that executes one or more algorithms for matching bids and offers.

A trade database 108 may be included to store information identifying trades and descriptions of trades. In particular, a trade database may store information identifying the time that a trade took place and the contract price. An order book module 110 may be included to store prices and other data for bid and offer orders, and/or to compute (or otherwise determine) current bid and offer prices. A market data module 112 may be included to collect market data, e.g., data regarding current bids and offers for futures contracts, futures contract options and other derivative products. Module 112 may also prepare the collected market data for transmission to users. A risk management module 134 may be included to compute and determine a user's risk utilization in relation to the user's defined risk thresholds. An order processor module 136 may be included to decompose delta based and bulk order types for further processing by order book module 110 and match engine module 106.

A clearinghouse module 140 may be included as part of exchange computer system 100 and configured to carry out clearinghouse operations. Module 140 may receive data from and/or transmit data to trade database 108 and/or other modules of computer system 100 regarding trades of futures contracts, futures contracts options, OTC options and contracts, and other financial products. Clearinghouse module 140 may facilitate the financial product exchange acting as one of the parties to every traded contract or other product. For example, computer system 100 may match an offer by party A to sell a financial product with a bid by party B to purchase a like financial product. Module 140 may then create a financial product between party A and the exchange and an offsetting second financial product between the exchange and party B. As another example, module 140 may maintain margin data with regard to clearing members and/or trading customers. As part of such margin-related operations, module 140 may store and maintain data regarding the values of various contracts and other instruments, determine mark-to-market and final settlement amounts, confirm receipt and/or payment of amounts due from margin accounts, confirm satisfaction of final settlement obligations (physical or cash), etc. As discussed in further detail below, module 140 may determine values for performance bonds associated with trading in products based on various types of currency pairs.

Each of modules 102 through 140 could be separate software components executing within a single computer, separate hardware components (e.g., dedicated hardware devices) in a single computer, separate computers in a networked computer system, or any combination thereof (e.g., different computers in a networked system may execute software modules corresponding more than one of modules 102-140).

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may implement one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics, radio links or other media.

A wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet. Computers 116, 118 and 120 may communicate with each other via the Internet 126 and/or LAN 124.

One or more market makers 130 may maintain a market by providing constant bid and offer prices for a derivative or security to exchange computer system 100. Exchange computer system 100 may also include trade engine 138. Trade engine 138 may, e.g., receive incoming communications from various channel partners and route those communications to one or more other modules of exchange computer system 100.

One skilled in the art will appreciate that numerous additional computers and systems may be coupled to exchange computer system 100. Such computers and systems may include, without limitation, additional clearing systems (e.g., computer systems of clearing member firms), regulatory systems and fee systems.

The operations of computer devices and systems shown in FIG. 1 may be controlled by computer-executable instructions stored on non-transitory computer-readable media. For example, computer device 116 may include computer-executable instructions for receiving market data from exchange computer system 100 and displaying that information to a user. As another example, clearinghouse module 140 and/or other modules of exchange computer system 100 may include computer-executable instructions for performing operations associated with determining performance bond contributions associated with holdings in products that are based on various types of currency pairs.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

In some cases, the exchange computing system 100 may be configured to create and/or price an implied volatility derivative product based on an implied volatility of an underlying financial product. In at least some embodiments, the exchange computer system 100 (or "system 100") receives, stores, generates and/or otherwise and processes data. In accordance with various aspects of the invention, the exchange computing system 100 may obtain pricing information corresponding to the underlying financial product from a financial market. This may promise a more straightforward way for investors to take a position based on implied volatility of a financial product.

In certain examples, a user interface may use highlighting to indicate orders that may result in a cross trade. Different color highlighting may be used within the stack of order book depth to distinguish between the orders of the trader viewing the stack, and orders from other traders within the same company. In some cases, variations of the color-coded highlighting, such as border highlighting, may be used to further differentiate between cross trade orders at the top of the book versus cross trade orders lower in the order book stack. If a trader attempts to hit or lift a highlighted order, the user interface can display a popup including information about the potential cross trade. For example, the popup window may provide a warning notifying the trader of a potential cross trade with another member of the same company and/or of a potential cross trade with themselves.

In some examples, an exchange or other entity may identify elements to be highlighted or otherwise marked. The information may be transmitted to traders or others in a form intended to be used when generating views on the user interface. Traders may receive the information and display the user interface on a desktop computer, tablet computer, mobile terminal, tablet computer, smart phone, or some other computer device. For example, the exchange compute system 100 may generate a user interface for display on one or more remote devices via a wired or wireless network. For example, the user interface may be communicated via the network (e.g., the Internet, 126, the LAN 124, a wide area network (WAN), etc.) to be displayed on a user device such as the computer device 114, 116, 118, and 120. In other embodiments, a trader may use a desktop computer, tablet computer, mobile terminal or some other computer device to compile all of the information and generate the user interface. In an illustrative embodiment a trader's computer may be configured to determine which elements of a user interface should be highlighted or otherwise marked. These elements may then be used to generate the user interface.

FIGS. 2A-2D show a portion of an illustrative user interface for highlighting an order placed by a user or another individual associated with the user, based on trading systems and methods according to at least some embodiments. In some cases, a user interface may be defined to display one or more trading orders in a grid view, such as in an order matrix. In some cases, the order matrix may include a portion 200 of a user interface that may be configured to display one or more orders related to a particular financial product (e.g., the financial product 215). In the illustrative example, this portion 200 of the user interface may display orders related to different terms 220 of the financial product 210. In some cases, the orders may be displayed as an order stack that may be shown in a collapsed view 240 or an expanded view 250. For example, a collapsed view 240 may be denoted by a "+" sign, either shown or highlighted in the order matrix. Similarly, the expanded view 250 may be denoted by a "−" sign, either shown or highlighted in the order matrix. In some cases, the order matrix may display a quantity 228 and a bid price 230 associated with each of the trade orders on the order stack.

In some cases, the illustrative user interface may include one or more options for highlighting cells to differentiate between different potential orders that may be displayed in an order matrix of the user interface. In some cases, a user (e.g., a trader) may be a member of a business organization where multiple potential trades may be placed for a same product over a given time period (e.g., a trading day). In some cases, these potential orders may be made on either a buy-side or a sell-side of a potential trade. Often, such as when a large number of orders for a given product have been received in a system, a trader may not be aware of orders in the system previously placed by the trader or other members of the associated business organization. In some cases, this may potentially cause the trader to close a trade with himself (herself), or close the trade with another member of his (her) business organization.

To avoid this situation, the illustrative user interface may provide a visual indication of orders placed by the trader viewing and/or logged into the user interface, such as by highlighting order placed by the trader in a predefined color (e.g., blue). Further, the user interface may also provide a visual indication of orders placed by other members of the trader's business organization, using a different predefined color (e.g., green). In some cases, the user interface may use the same color for identifying orders placed by the trader or other members of the trader's organization. Further, because orders may be organized using an order stack, the user interface may include options for identifying whether a potential order placed by the trader or other member of the trader's organization is at the top of the order stack, or at a lower level of the order stack.

For example, when a bid, such as the bid of an order at the top of the order stack, such as the bid of order 232, has been placed by the trader viewing the user interface, or another member of the trader's business organization, at least a portion of the order (e.g., the bid price) may be highlighted in a solid color. For example, when an order 232 placed by the trader is at the top of the order stack, the associated bid price cell in the order matrix may be highlighted in a specified color, such as blue. Similarly, if this order 232 had been placed by another member of the trader's organization, the bid price cell may be highlighted in a same or different color, such as green.

In some cases, the trader's orders, or orders placed by other members of the trader's organization may be lower in the order stack. Because of this, these trades may not be visible in a collapsed view 240 of the trade. To indicate to a user, such as the trader, that orders placed by them, or other members of their business organization, the user interface may use a different form of highlighting to visually show a user that they, or members of their organization have already placed orders for that particular financial product. For example, in cell 234, the border 235 of the cell 234 may be highlighted with a color to identify whether the trader (e.g., blue) or another member of their business organization (e.g., green) have placed an order that is located lower in the order stack. In such cases, these orders may be displayed when the order stacks have been expanded to show the expanded view 250. For example, a user's order 262 may be identifiable by a highlighted cell of a particular color (e.g., blue). In other cases, the expanded order stack 230 may include two or more orders placed by the trader and/or other members of the trader's business organization. For example, these orders 264, 266 may be highlighted in a same color (e.g., green) to represent order's placed by members of the same business organization, or using different colors (e.g., blue, green, etc.) when at least one of the orders has been placed by the trader viewing, or logged into, the user interface.

FIGS. 3A and 3B show an operation of an illustrative hold/cancel button, according to at least some embodiments. For example, the user interface may include a hold/cancel icon 310 in the trading grid (e.g., the order matrix). In some cases, this icon may be used with the order highlighting discussed above in reference to FIGS. 2A-2D. For example, the hold/cancel icon 310 may be displayed in, or near, a highlighted cell. In some cases, an action associated with the old/cancel icon 310 may be configurable. For example, a user (e.g., a trader, an administrator, etc.) may be able to configure the hold/cancel icon to place a hold on an associated order, or cancel the particular order, when selected. In some cases, the hold or cancel functionality of the hold/cancel icon 310 may be configured globally for the application, or may be configured to hold or cancel orders placed on selected financial products. For example, a trader may desire to use the hold/cancel icon to cancel orders associated with a first financial product and to use the hold/cancel icon to place orders associated with a second financial product on hold. In some cases, a user may be assigned rights to cancel or hold any order associated with the business organization. For example, an administrator, using an administrator console, may grant one or more users permission to cancel company orders and/or place company orders on hold. In such cases, if a user has not been granted these permissions, the hold/cancel icon may not be displayed, or operate, with company orders. In an illustrative example, 350 a hold/cancel icon may be associated with each of the orders associated with the trader and/or the trader's company. In 350, the orders 360, 370 are shown to be canceled, as denoted by the "x". In some cases, when multiple orders at a same price level are listed in an order stack, a trader may cancel each of the orders individually. In some cases, the user interface may be configured so that a user may cancel every order for which permissions have been granted, by using a single hold/cancel button associated with an order at that particular price.

FIGS. 4 and 5 show illustrative windows for showing further information about highlighted orders according to some embodiments. For example, a user may hover a pointing device (e.g., a mouse, a stylus, a finger, etc.) over a highlighted cell in the order matrix. In some cases, this information may be displayed using a right click, a selected menu option, or the like. While the pointing device is hovering over the cell an additional window (e.g., a tooltip) may be visible and show further information about the order. For example, an illustrative tooltip 400 may show one or more features of an order such as a financial product name, a term, a status, a price, a quantity, an amount of filled contracts, an order type, a length in time that the order is active, an age of the order, a name of the associated trader, a business organization associated with the trader and/or a clearing house associated with the order. In some cases, the window may be configured to display a short name for the trader and/or business organization, a full name of the trader and/or business organization, or both.

In some cases, a window or tooltip may be provided to display information about statistical information related to an associated financial product. This window may be displayed by hovering a pointing device over a portion of the order matrix associated with the financial product. In some cases, this information may be displayed using a right click, a selected menu option, or the like. In an illustrative example, statistical information may be displayed in a window 500 and may include one or more of a trade time, a volume, a change in price, a high price, a low price, a settlement price, and the like. In some cases, the statistics viewable in the window 500 may be configurable at a system level and may apply to one or more financial markets (e.g., an over the counter market, a financial exchange, etc.) so that the information displayed may be customizable based on the information available from a particular market.

In some cases, the user interface may allow a user to make changes to one or more global groups so that they automatically become local groups, such as groups including financial products, orders for the financial products and/or potential orders for the financial products. In such cases, the user may use options, such as right click options, which may be used to add and/or remove items from a local group. In some cases, the same or similar menu options may be added for use with global groups where the user does not have rights to change the group. In such cases, as the user adds or removes an item the global group may be automatically converted to a local group and the item may be changed. For example, a global group that may be used by two or more different user interfaces may be converted to a local group active on a single user interface. In some cases, a new menu option may be used for converting a global group to a local group when the user does have rights to change the group, such as by using an option to "convert to local group". For example, a menu 600 may include a menu selection that may be used to modify and/or convert a group. For example, an illustrative menu selection 610 may include one or more options for working with the group. For example, the menu selection may include an option 620 for canceling one or more held orders for the group. In some cases, the menu 600 may include one or more options 630 for editing the group, such as to add items to a group, remove items (e.g., financial products) to a group and/or to edit the group within another tool that may be designed for editing groups. In some cases, the menu 600 may include an option to convert a global group, such as a group of financial products, to a local group at a user interface at a user computer device. In some cases the menu item may include an option for showing the group in a same window or a new window. In some cases, including such group options may improve the acceptance of global group for different groups of traders, such as traders on an exchange.

Figures 6, 7, 8:
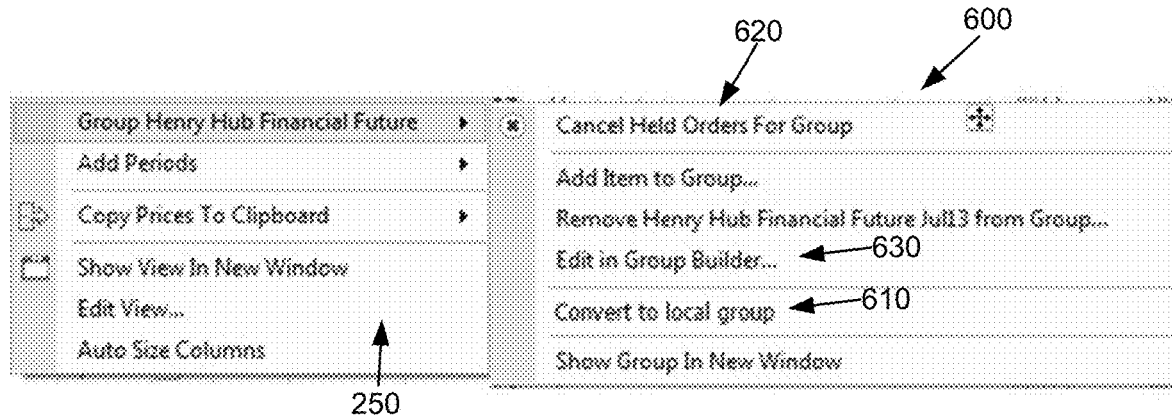
FIG. 6 shows an illustrative menu diagram according to aspects of the present invention.
FIGS. 7 and 8, the user interface may include an order book according to aspects of the present invention.

In some cases, such as in FIG. 7, the user interface may include an order book, such as the order book 700. The order book may include options for changing a color of a cell based on a status of the order and or the side (e.g., a buy side, a sell side, etc.) of the order. In some cases, the buy side and/or sell side colors may be pre-defined, such as by a defining a system default. For example, the buy side color may be set to red and the sell side color may be set to blue. In some cases, a color associated with the different order statuses may be configurable by a user. In some cases, colors defined for the order stat colors may be set to default order colors, such as by using pale green to represent filled orders, yellow to represent partially filled orders, orange to represent partially filled and cancelled orders, pale orange to represent working orders, white to represent held orders, and red to show canceled orders.

In some cases, the user interface may include an option to freeze a column and/or row of an order matrix. The freeze column option may be used by indicating a range of columns to freeze and may be specified in terms of a number of frozen columns. This feature may be enabled on one or more different matrixes and/or grids. In some cases, the freeze column option may not be enabled for trading grids. In an illustrative example, of FIG. 8, a frozen column 810 may be set after a specified column, such as the type column 820. As such, any scrolling may only affect any columns to the right 830 of the type column 820. In some cases, the frozen column boundary may be indicated by a vertical grid line 840. In some cases, a re-ordering of columns may not affect the frozen column setting. For example, if another column (e.g., the TIF) column is added and/or dragged to the right of the type column, then an associated horizontal scroll bar may only scroll columns to the right of the TIF column 850.

Figure 9:
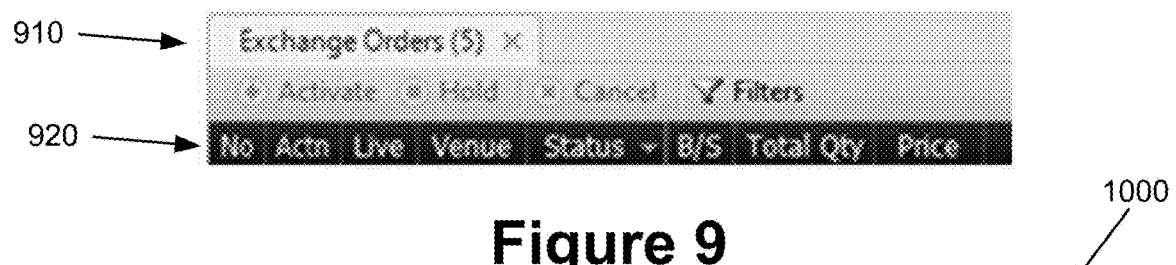
FIGS. 9-11 show illustrative options and/or features associated with filters according to aspects of an embodiment.
Figure 10:
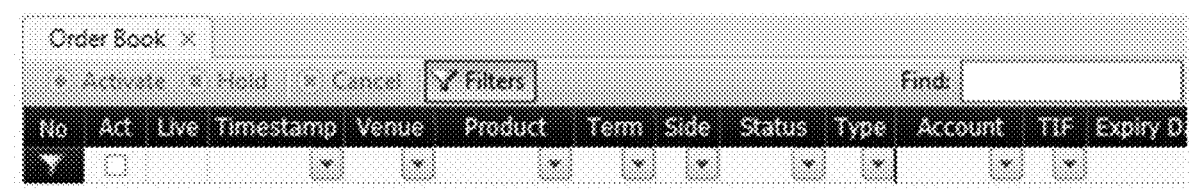
Figure 11:
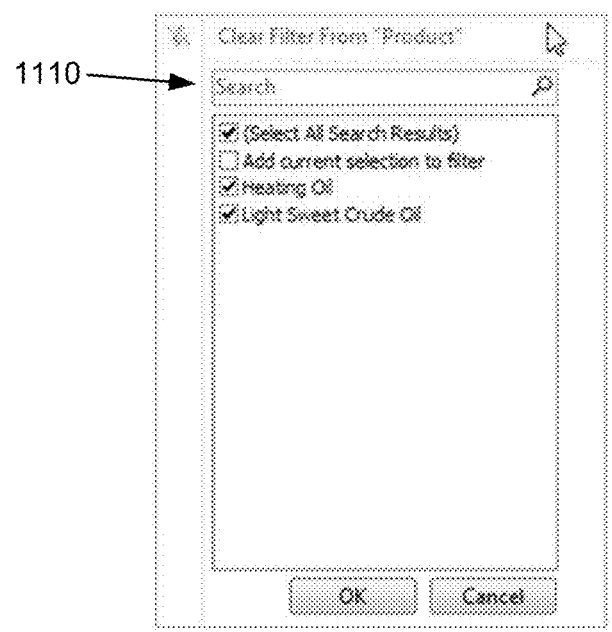

FIGS. 9-11 show illustrative options and/or features associated with filters according to aspects of an embodiment.

For example, a row header number 910 may be used to more easily count a number of rows that may match, or be returned by, a filter. In an illustrative case, a row header column 920 may be added and may include a row count. In some cases, this feature may be available for one or more different grids and/or matrixes. In some cases, this feature may not be available for one or more different grids, such as a trading grid. In an illustrative example, an order book may be filtered to display working orders for a financial product. In this case, a broker associated with the user interface may have 5 working orders and may have 10 filled orders. As such, the count displayed in the row header column 920 would be 5. If the broker modifies the filter to display all working and filled orders, then the number displayed would be 15.

FIG. 10 shows an illustrative filter row 1000 according to aspects of an embodiment. In some cases an order book may include the filter row 1000 that may allow the user of the user interface to filter one or more specific columns. The filter row 1000 may allow a user to individually set one or more filters for the different columns in the order matrix using one or more different selection methods, such as by using a dropdown menu, a context menu, and/or other such filter selection methods. When a filter has been set in a column, text associated with the filter may appear in a cell of the filter row associated with the column being filtered. In some cases, an indicator (e.g., a row count indicator) may show an indication of a whether a filter has been defined and/or activated. In some cases, this indication may be used to indicate which filter is active when a filter icon and/or filter row text may not be visible on a screen of the user display.

FIG. 11 shows an illustrative filter dropdown menu 1100 according to an aspect of an embodiment. In some cases, when a filter button on the user interface screen is clicked, the filter dropdown menu 1100 may be displayed. In some cases, the filter dropdown menu 1100 may include a "search" box 1110. This search box may allow the user to restrict the list of available items visible in the checklist of the filter dropdown menu 1100. This feature may be used with one or more different filter types that may allow selection of a large number of search items in the checklist. For example, a product, a term and/or a user filter may include a large number of searchable items. As such, when a search is entered into the search box an additional option to add a selected term to a filter, such as a search term or a result obtained from using the search term, may be displayed. In some cases these additional features option may automatically add filtered terms into an existing set of terms. In an illustrative case, a filer may be customizable using one or more filter types as discussed below.

In some cases, a column may not be filterable and, as such, the filter icons may not appear. In some cases, a filter may be selected from one or more different types. In some cases, a filter selection type may include a pick list, which may display as a set of predefined values. For example, for a Buy/Sell column, the filter selections may include "Select All", "Buy (B)", and/or "Sell (S)". In some cases, a filter may be selected using a standard filter selection type such as a numeric filter, a string filter, and/or a date/time filter. For example, the numeric filter may be used to filter based on a particular number (e.g., 1) and may be configured to match an integer representation, a decimal representation or both. Similarly, the string filter may be used to match a string, or a portion of a string. In some cases, the string filter may be used to perform a contents search, to match a selected search term against a portion of a string. An illustrative date/time filter may be used to match a date, or a specified time period. For example, an illustrative date/time filter may include options such as, "Today", "Past 2 Days", "Past 3 Days", "Past Week", and/or the like.

In some cases, a filter may include a modified pick list filter, such as a term filter, a product filter, and/or a user filter. For example, a filter may be selected using a term filter. A term filter may be a special type of pick list filter, where the filter dropdown menu displays the list of available periods from the local period cache, which may further be grouped by a period name. Similarly a product filter may be configured as a pick list filter where an associated dropdown menu may display a list of products locally available to the user interface. Also a user filter may be configured as a pick list filter where an associated dropdown may display a list of users locally available to the user interface, including a user logged into the user interface. For example, the user interface selections may include "my", "company", "user name 1", "user name 2", etc.

When a filer has been set, a menu option (e.g., a right click menu option) may enable to filter to be saved. In some cases, saved filters may be visible as part of the user interface, such as a tab at the top and/or bottom of the user interface. By clicking on the filter, a visual indication that a particular filter has been selected may be used, such as a text color, a filter image, highlighting, and the like. In some cases, a cross on the table may be used to delete a particular tilter that may be associated with the tab. Further, by selecting an option, a user may be able to deselect a tab and clear the filter.

In some cases, an order book may support one or more different column and/or column types. In some cases, an order book associated with a user interface may include a number of columns. By default a specified number of columns (e.g., 10 columns) may be frozen, so that when a user scrolls through the order book or order matrix, a number of columns may be frozen. For example, a column (e.g., a filled quantity column) may be specified as where the user interface is frozen so that the specified column, and the columns to the left, may not be scrolled by the user. In an example, illustrative column names and/or column types may include any number of the columns of Table 1.

TABLE 1

Illustrative order book columns

| Default Position | Column Header | Description | Filter Type | Filter Examples |
|---|---|---|---|---|
| 1 | Live | Activate/Cancel/Hold button | None | |
| 2 | Modify | Modify button | None | |
| 3 | Product | Product name | Product | |
| 4 | Term | Term name | Term | |
| 5 | B/S | B(uy) or S(ell) | Pick List | (Select All) B S |

TABLE 1-continued

Illustrative order book columns

| Default Position | Column Header | Description | Filter Type | Filter Examples |
|---|---|---|---|---|
| 6 | Qty | Total quantity of order | Numeric | |
| 7 | Price | Limit price | Numeric | |
| 8 | Status | Order status | Pick List | (Select All) Working Partially Filled Filled Filled (Cancelled) Held |
| 9 | Trade Price | Weighted average trade price across all fills | Numeric | |
| 10 | Filled Qty | Filled quantity | Numeric | |
| 11 | Disclosed Qty | Disclosed quantity | Numeric | |
| 12 | Stop Price | Stop price (for Stop orders) | Numeric | |
| 13 | Type | Order type | Pick List | (Select All) Limit Stop Stop-Limit Market Market-Limit |
| 14 | TIF | | Pick List | (Select All) Day GTD GTC FAK FOK |
| 15 | Expiry Date | | Date Time | |
| 16 | Acct | | String | |
| 17 | Trader | | User | |
| 18 | Owner | | User | |
| 19 | Venue | | Pick List | (Select All) OTC Exchange |
| 20 | Timestamp | | Date Time | |
| 21 | Notes | | String | |
| 22 | GU Firm | | String | |
| 23 | GU Acct | | String | |
| 24 | APS | | Pick List | (Select All) Default Order Group |
| 25 | SLEDS | | Pick List | (Select All) Default Prior Settlement Execution Price |
| 26 | CTI | | Pick List | (Select All) 1 2 3 4 |
| 27 | Sender Sub ID | | String | |
| 28 | Sender Comp ID | | String | |
| 29 | HON | | String | |
| 30 | TON | | String | |

Figure 12:
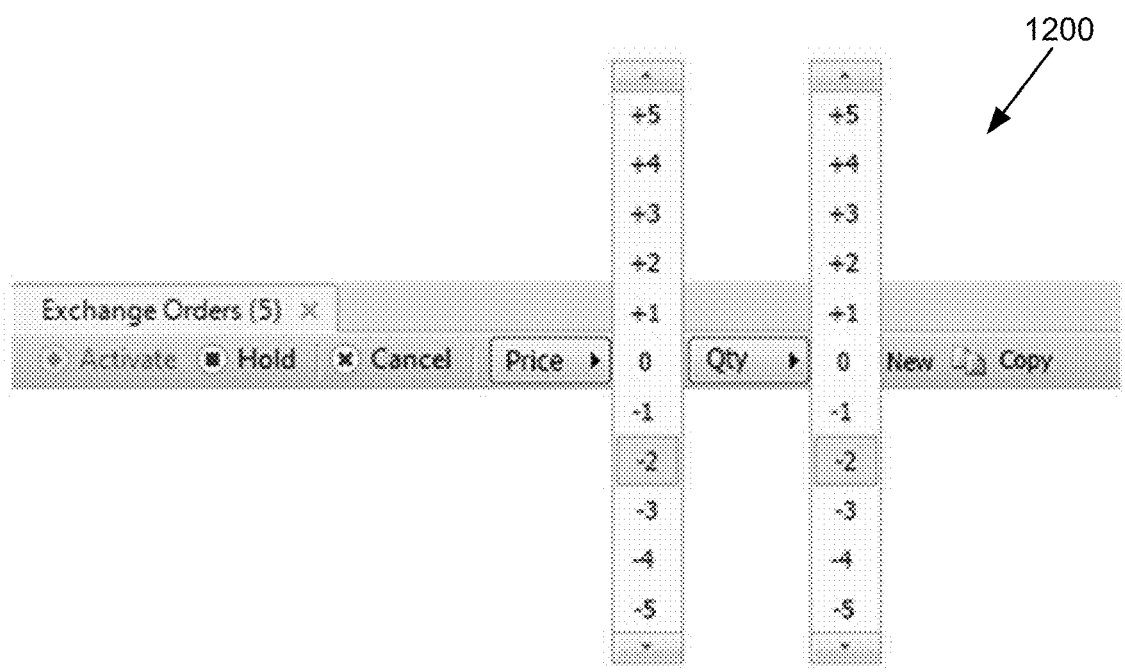
FIG. 12 shows an illustrative order book toolbar 1200 that may be used to provide buttons for one or more actions according to aspects of the present invention.

FIG. 12 shows an illustrative order book toolbar 1200 that may be used to provide buttons for one or more actions. The buttons may include an "Activate" button to activate selected orders, a "Hold" button to hold one or more selected orders, a "Cancel" button to cancel one or more selected orders, a "Price Up/Down" button to increment/decrement a price of the selected orders by one or more ticks, a "Quantity Up/Down" button to increment or decrement the quantity of the selected orders by one or more ticks, a "Copy" button to launch an order entry form pre-populated with details of a selected order to allow a user to easily copy an order, and/or a "New" button to allow a new order to be entered. In some cases, the number of ticks may be configurable.

In some cases, the user interface may allow a user to select multiple orders to allow different actions to be performed. For example, a column may be included in the order matrix to allow the selection of the orders using a check box for each row. Also, within the filter row of the order matrix, a checkbox may be included. If checked, all rows in the order matrix may automatically be checked. If unchecked, all selected rows may be unselected. As such, this filter row check box may allow a user to quickly check and/or uncheck a number of order rows.

When more than one order has been selected, a context menu, such as an "Order Actions" menu may be available for use by a user of the user interface. In some cases, the Order Actions menu may allow for multiple orders to be included in one ticket. As soon as there is more than one order selected a new context menu "Order Actions" may be available. This menu allows the following actions to be applied. As such, multiple orders may be changed using an order dialog window such as by moving a date, setting a note and/or changing an associated order type. Also a row color may be selected by a user to provide a visual representation that may be used to differentiate and/or identify orders by color. In some cases, the menu may allow a user to add and/or remove orders to or from an order basket.

In some cases an order dialog may be modal and so only one can be opened. In some cases, the user interface may allow multiple order dialogs to be opened at the same time. In some cases, a limit may be set to limit a number (e.g., 20) of order dialogs that may be opened. In some cases, traders may submit orders into the market in close succession. By allowing the multiple order dialogs to be open at a same time, the trader may be able to prepare all of the desired orders and submit each of the orders in quick succession. In some cases, the order entry dialogs may be at a top level of the user interface.

In some cases, an option may be enabled in the user interface to enable self-trade protection. Self-trade protection may be used for all orders processed electronically by an exchange or other entity. This self-trade protection may have one or more settings. For example, self-trade protection may be disabled so that no self-trades checks may be done. When enabled, a self-trade check may be configured to issue a warning or an error. In some cases, an error may stop an order from being submitted. When a warning or an error has been selected to be used for self-trade protection, a dialog may be displayed on a submission of any order that matches a same trader's existing order. For example, a message (e.g., "This order may match another of your orders and self-trade.") may be displayed. In some cases, the self-trade protection may be enabled for use with one or more trading mechanisms. In other cases, if a spread position may be implied from an outright position order, the outright position may still be traded. In some cases, a warning may pause the execution of an order. In such cases, a warning dialog may prompt a user to confirm the trade to override the warning.

In some cases, an option may be enabled in the user interface to enable company-trade protection. For example, the company trade protection option may offer similar settings to the above mentioned self-trade protection. As such, company trade protection may be disabled, may be set to issue a warning when the trader is about to trade with another member of the same business organization, or issue an error and stop an order from being submitted when likely to trade with the trader's business organization. When a warning or error has been selected, a dialog may be displayed on the submission of any order by a trader that may match an existing order placed by a member of the trader's business organization. In some cases, the company trade protection may be offered for use with any order processed through the user interface. In other cases, the company trade protection may be used when the trader's business organization is registered with an organization associated with the user interface. In some cases, the warning or error functionality may be disabled when a spread trade may be implied by the outright order. If so, the outright order may still trade. In some cases, orders submitted through a broker and/or a trader may (or may not) issue a warning or error. In some cases, orders may exist in a trading client that may be separate from the user interface. As such protection against trading with a business organization associated with the trader may have timing risk. In some cases, a warning may pause the execution of an order. In such cases, a warning dialog may prompt a user to confirm the trade to override the warning. When a warning or an error has been selected to be used for company trade protection, a dialog may be displayed on a submission of any order that matches a trade associated with the trader's business organization. For example, a message (e.g., "This order may match another in your company and trade.") may be displayed.

In some cases, one or more additional menu options may be available to a user in relation to a highlighted cell in an order matrix. In such cases, these options may be applied to all orders of a particular financial product and at a particular price level. In some cases, these additional options may include a modify order option, a copy order option, a hold option, a cancel option, and/or the like. In some cases, the user interface may automatically disable such options when not applicable to a particular order. For example, the "copy order" option may be disabled or removed when multiple different orders exist at a particular price point. In some cases, a menu window, e.g., a modify order window, may be opened when a highlighted cell has been properly selected, such as by using a double click).

Figure 13:
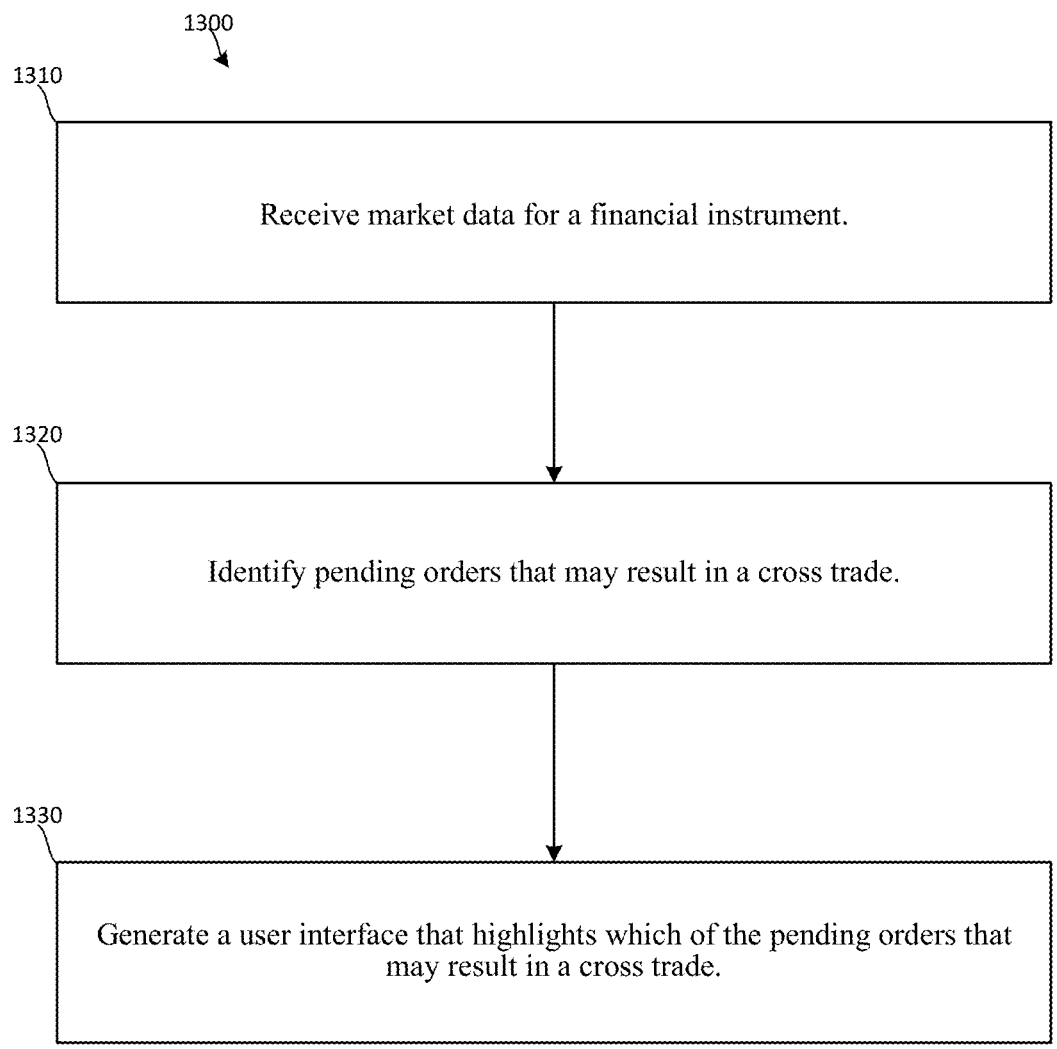
FIG. 13 shows an illustrative method 1300 for highlighting pending orders, such as pending orders that may result in a cross-trade.

FIG. 13 shows an illustrative method 1300 for highlighting pending orders, such as pending orders that may result in a cross-trade. For example, at 1310 market data may be received at a computing device. For example, a computer device 120 may be configured to receive market data from a financial exchange or other such sources. At 1320, the computing device may identify one or more pending orders that may result in a cross-trade. For example, the computer device 120 may review one or more fields associated with orders to determine whether the order is associated with a trader, or associated with a trader's business organization (e.g., company). At 1330, the user interface may generate a highlight the pending orders that are associated with the trader or the trader's business organization. For example, the computing device may highlight a trader's trade in a trading matrix of the user interface in a first color (e.g., blue) and may highlight a trade associated with the business organization in a second color (e.g., green).

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. All are considered within the sphere, spirit, and scope of the invention.

What is claimed is:

1. A non-transitory computer-readable medium containing computer-executable instructions that, when executed by one or more processors, cause a computing device to:
  receive, via a network from an exchange computing system, market data for a financial instrument;
  identify, one or more pending orders of an order stack based on the market data;
  generate a user interface screen presenting a plurality of trades for the financial instrument in an expandable grid format, wherein a collapsed form of the expandable grid format corresponds to a view of a current entry in the order stack and an expanded view of the expandable grid format corresponds to a view having a row associated with each entry in the order stack;

display, on a user interface screen at a user device, an identifier of one or more pending orders in the order stack reflecting a potential cross trade, wherein the identifier of the potential cross trade includes:
shading a cell in a specified color when a corresponding trade has been identified as a possible cross trade when the order stack is shown in the expanded view; and
highlighting a border of the cell at a top level of the order stack in the specified color when the order stack is shown in the collapsed form; and
display, at the user device, a popup window identifying a potential cross trade associated with a user of the user device.

2. The non-transitory computer-readable medium of claim 1, containing computer-executable instructions that, when executed by the one or more processors, cause the computing device to:
highlight a first pending order in the user interface based on a relationship between the user of the user device and a trader that placed the first pending order.

3. The non-transitory computer-readable medium of claim 2, containing computer-executable instructions that, when executed by the one or more processors, cause the computing device to:
highlight the first pending order in the user interface using a first color when a self-trade has been identified.

4. The non-transitory computer-readable medium of claim 3, containing computer-executable instructions that, when executed by the one or more processors, cause the computing device to:
shade a cell containing the first pending order in the user interface using the first color when the first pending order is at a top of the order stack; and
highlight a border of the cell containing the first pending order in the user interface using the first color when the first pending order is lower than the first order in the order stack.

5. The non-transitory computer-readable medium of claim 2, containing computer-executable instructions that, when executed by the one or more processors, cause the computing device to:
highlight a second pending order in the user interface using a second color when the trader that placed the second pending order is associated with the user.

6. The non-transitory computer-readable medium of claim 1, containing computer-executable instructions that, when executed by the one or more processors, cause the computing device to:
highlight a cell associated with a collapsed view of the order stack when an order in the order stack is associated with one of the user or an organization of which the user is a member; and
shade one or more cells in the expanded view of the order stack, wherein a color used to highlight the one or more cells differentiates between a potential self-trade and a potential trade with the organization of which the user is a member.

7. A method comprising:
receiving, at an exchange computing system, market data for a financial instrument;
identifying, by the exchange computing system, one or more pending orders that may result in a cross trade; and
generating, by the exchange computing system for display at a remote user interface device, a user interface screen that highlights the identified one or more pending orders that may result in a cross trade, wherein a color associated with a highlighted order corresponds to a characteristic of the highlighted order;
presenting, on a display device of the remote user interface device, the user interface screen received from the exchange computing system;
shading, in a specified color, a cell associated with an order of an order stack when the order has been identified as a potential cross trade;
highlighting in the specified color, for a collapsed view of the order stack, a border of the cell associated with a current order of the order stack when a non-visible order in the order stack has been identified as a potential cross trade; and
displaying, on the remote user interface device at the user device, a popup window identifying a potential cross trade associated with a user of the user device.

8. The method of claim 7, comprising:
highlighting a cell associated with a pending order on the remote user interface using a first color to identify a trade associated with the user and a second color to identify a trade associated with an organization of which the user is a member.

9. The method of claim 7, comprising:
generating an order stack viewable on the user interface, wherein the order stack displays a first order when the order stack is displayed in a collapsed view and displays the first order and at least a second order when the order stack is viewed in an expanded view;
displaying the order stack on the remote user interface with a shaded first order when the first order is associated with at least one of the user of the user interface and an organization associated with the user; and
generating a highlighted border around the first order when the second order is associated with at least one of the user of the user interface and an organization associated with the user.

10. The method of claim 9, comprising:
displaying an expanded view of the order stack; and
generating at least one of a shaded first order or a shaded second order based on whether the first order or the second order is associated with one of the user or the organization associated with the user.

11. The method of claim 7, comprising:
generating an order matrix, wherein information corresponding to a plurality of orders is displayed in a grid format; and
generating highlights for the plurality of orders in the order matrix based on an order status and an order side.

12. The method of claim 11, comprising:
generating a highlight for each of the plurality of orders to identify whether a particular order is a buy-side order or a sell-side order, wherein the buy-side order is highlighted using a first color and the sell-side order is highlighted using a second color.

13. The method of claim 11, comprising:
generating a highlight for each of the plurality of orders to identify an order status, wherein the order status includes a filled order status, a partially filled order status, a partially filled and canceled order status, a working order status, a held order status and a cancelled order status.

14. The method of claim 11, comprising:
receiving an error reaction configuration that defines an error reaction in response to a potential self-trade condition or a potential company-trade condition, wherein a self-trade condition corresponds to an order that may result in an order where a trader is both a buyer and a seller of a proposed trade, and the company trade condition corresponds to a trade where the trader and another member of an organization associated with the trader are the buyer and the seller of the proposed trade.

15. The method of claim 14, comprising:
generating an error window for displaying a warning message or an error message in response to a condition of the error reaction configuration being met, where the error window displays one of a self-trade warning, a self-trade error, a company-trade warning, and a company trade error.

16. A system comprising:
a user interface device; and
an exchange computing system communicatively coupled to the user interface device, wherein the exchange computing system includes:
a processor; and
a non-transitory memory device communicatively coupled to the processor, wherein the non-transitory memory device stores instructions that, when executed by a processor, cause the exchange computing system to:
receive market data for a financial instrument;
identify pending orders that may result in a cross trade;
generate a user interface screen presenting a plurality of trades for the financial instrument in an expandable grid format, wherein a cell at a top level of the expandable grid format corresponds to a current entry in an order stack and wherein:
a collapsed form of the expandable grid format corresponds to a view of the current entry in the order stack; and
an expanded view of the expandable grid format corresponds to a view having a row associated with each entry in the order stack;
identify one or more pending orders in the order stack that may result in a cross trade;
if one or more pending orders in the order stack have been identified as possible cross trades:
shade cells of the expandable grid format in a specified color when a corresponding trade has been identified as a possible cross trade with an organization associated with the user of the user device; and
highlight a border of a top level cell of the order stack when a non-visible order in the order stack has been identified as a possible cross trade with the organization.

17. The system of claim 16, wherein the non-transitory memory device stores instructions that, when executed by a processor, cause the one or more computing devices to:
communicate, via a network, the user interface screen that highlights which of the pending orders that may result in a cross trade to the user interface device for display to the user.

18. The system of claim 16, wherein the non-transitory memory device stores instructions that, when executed by a processor, cause the exchange computing system to:
generate the order stack viewable on the user interface screen, wherein the order stack displays a first order when the order stack is displayed in a collapsed view and displays the first order and at least a second order when the order stack is viewed in an expanded view.

19. The system of claim 16, wherein the non-transitory memory device stores instructions that, when executed by a processor, cause the exchange computing system to:
highlight a cell associated with a pending order in the user interface screen using a first color to identify a trade associated with a user viewing the user interface screen and a second color to identify a trade associated with an organization of which the user is a member.

20. The system of claim 19, wherein the non-transitory memory device stores instructions that, when executed by a processor, cause the exchange computing system to:
receive, via a network, an error reaction configuration from the user interface device, wherein the error reaction configuration defines an error reaction in response to a potential self-trade condition or a potential company-trade condition, a self-trade condition corresponds to an order that may result in an order where the user is both the buyer and the seller of a proposed trade, and the company trade condition corresponds to a trade where the user and another member of an organization associated with the user are the buyer and the seller of the proposed trade; and
generate a popup window identifying an identified potential self-trade condition or the potential company-trade condition based on the error reaction configuration.

* * * * *